April 12, 1960 C. GERST 2,932,208
COUNTERROTATING AND STEERING TRANSMISSION
Filed July 20, 1959 6 Sheets-Sheet 1

INVENTOR.
Chris Gerst.
BY
Balluff and McKinley
ATTORNEYS.

April 12, 1960   C. GERST   2,932,208
COUNTERROTATING AND STEERING TRANSMISSION
Filed July 20, 1959   6 Sheets-Sheet 3

INVENTOR.
Chris Gerst.
BY
Balluff and McKinley
ATTORNEYS.

April 12, 1960 C. GERST 2,932,208
COUNTERROTATING AND STEERING TRANSMISSION
Filed July 20, 1959 6 Sheets-Sheet 4
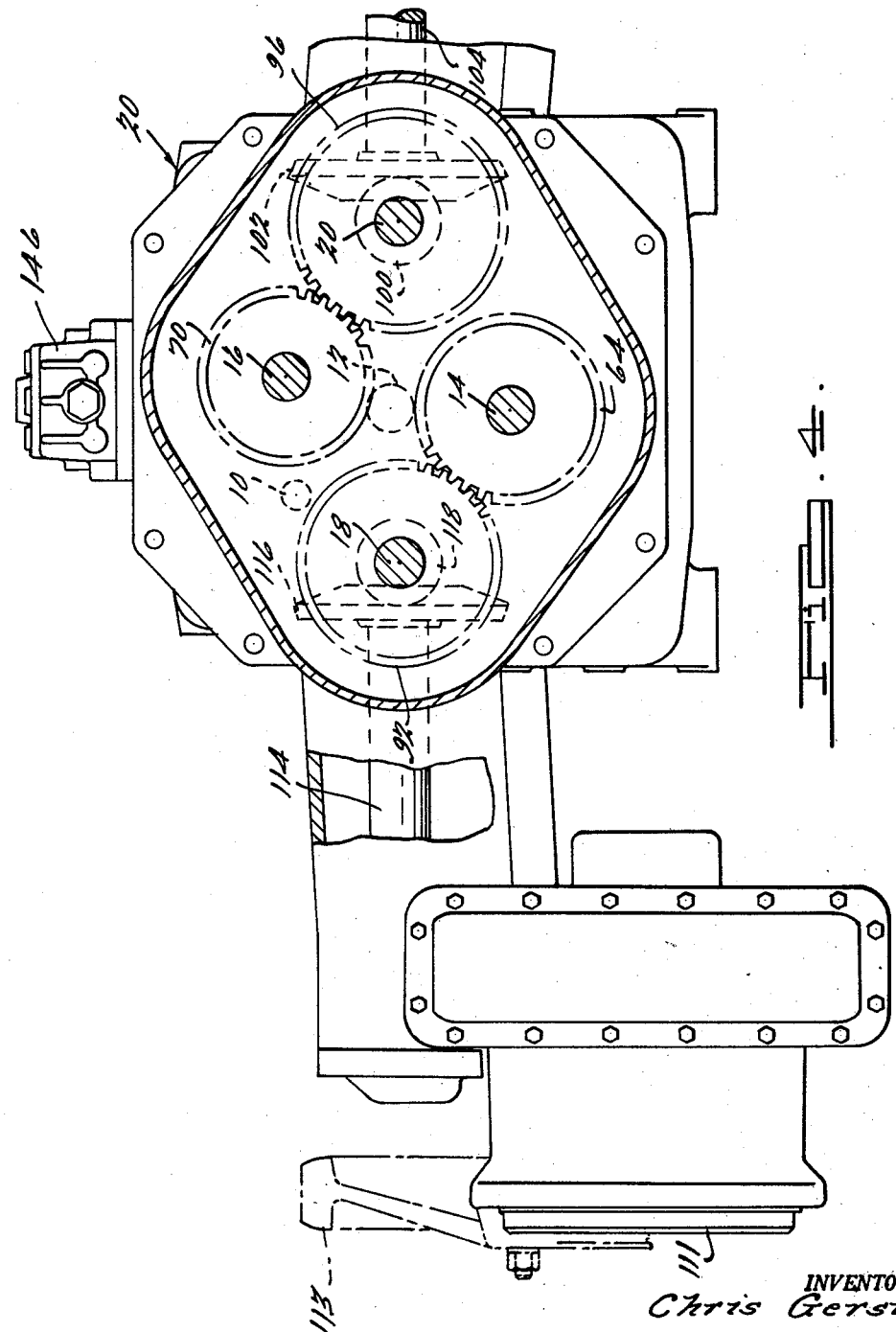
INVENTOR.
Chris Gerst.
BY
Balluff and McKinley
ATTORNEYS.

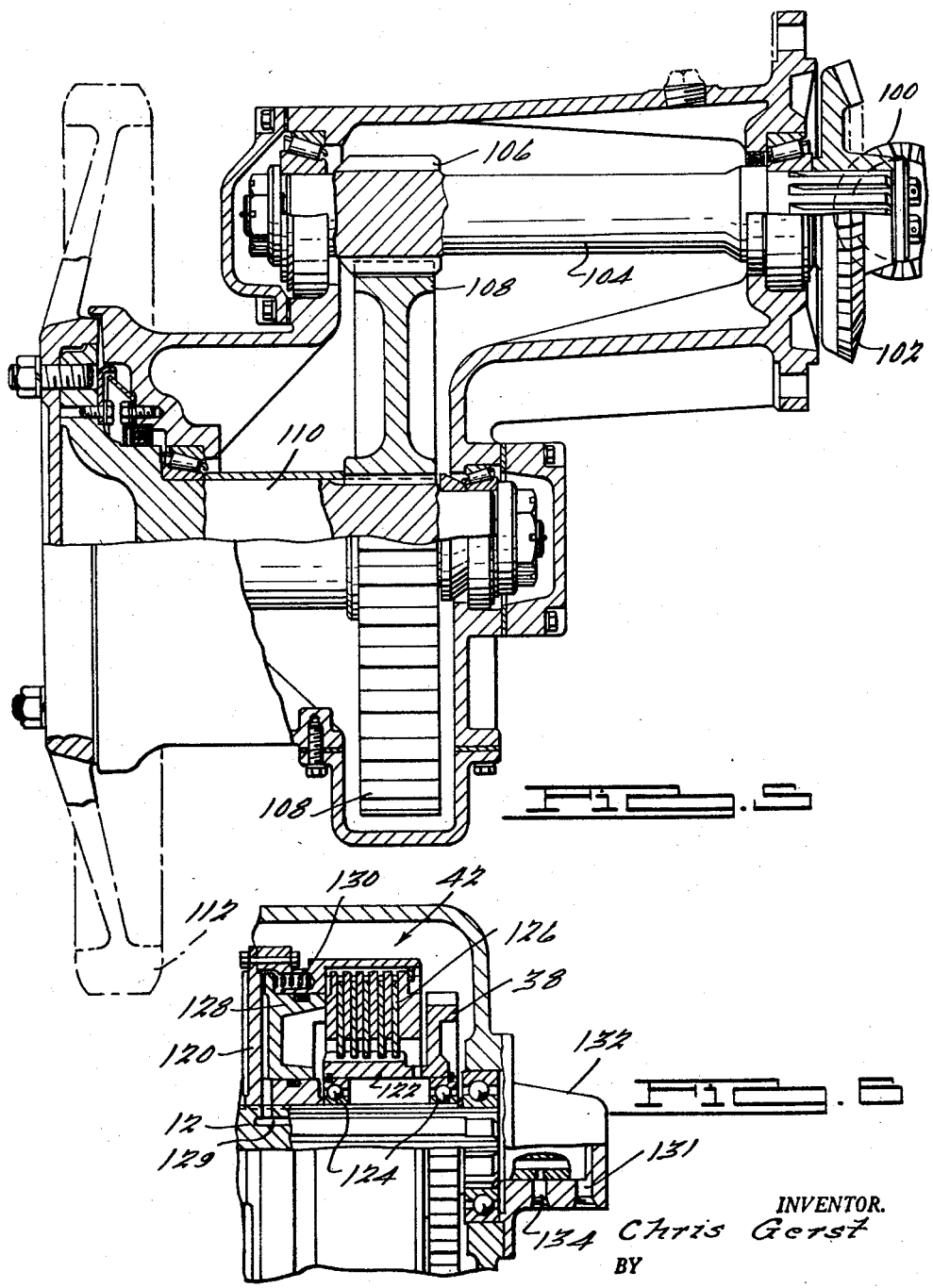

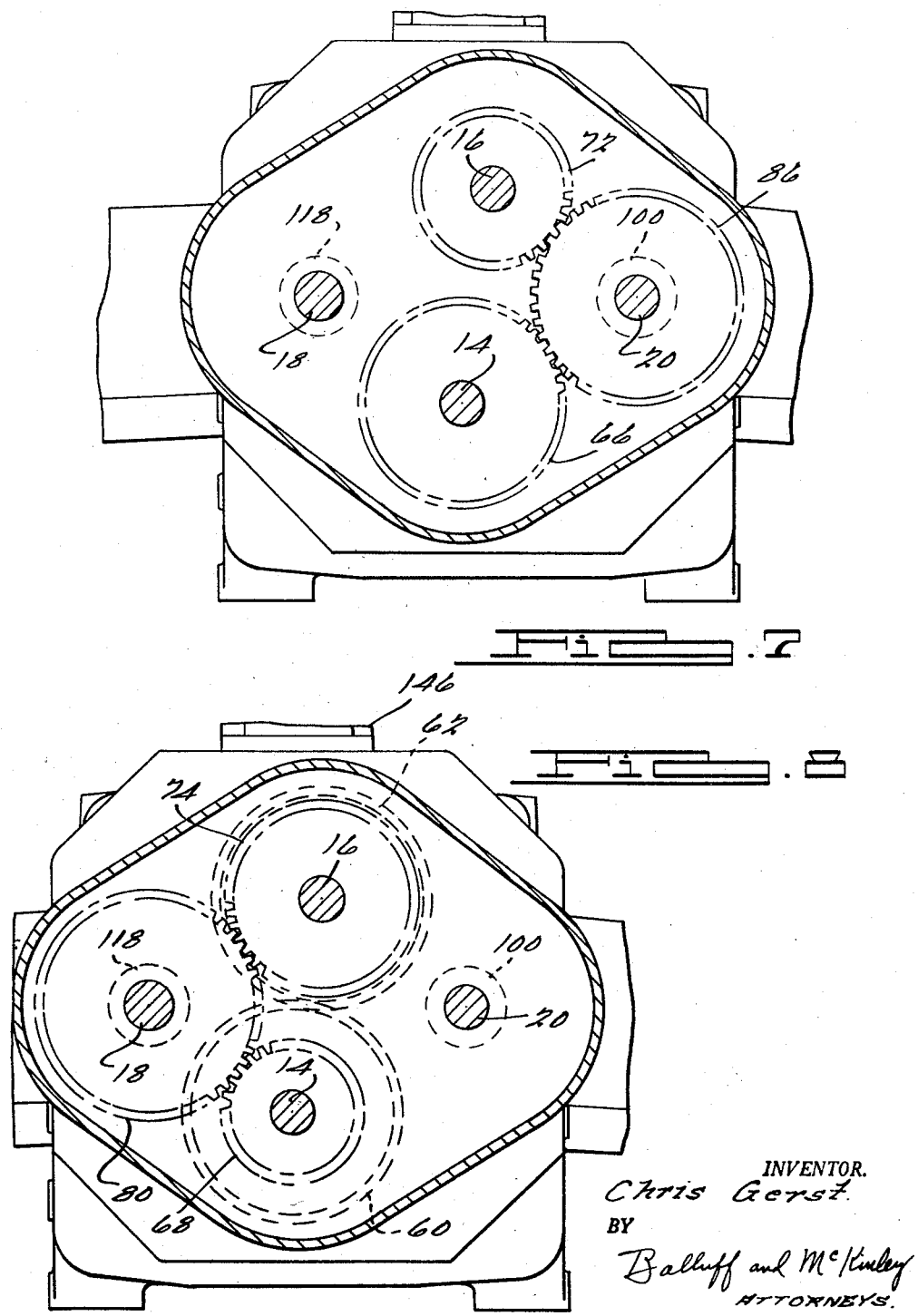

United States Patent Office — 2,932,208 — Patented Apr. 12, 1960

2,932,208

COUNTERROTATING AND STEERING TRANSMISSION

Chris Gerst, Detroit, Mich., assignor to The Transmission & Gear Company, Detroit, Mich., a corporation of Michigan Application July 20, 1959, Serial No. 828,189

13 Claims. (Cl. 74—360)

This invention relates to transmissions and has particular reference to a counterrotating steering transmission which is particularly adapted for use in tractor type vehicles and is adapted to provided an eight-speed forward and four-speed reverse drive for each driving sprocket or wheel, the arrangement being such that either of the drive sprockets may be driven independently of the other, or forwardly while the other is being driven reversely, or at a faster speed in a forward direction than the other.

A principal object of the invention is to provide a novel, simple and relatively inexpensive counter-rotating steering type of transmission which is particularly adapted for use on tractors.

Other objects and advantages of the invention will be apparent from the following specification and the accompanying claims and may be understood by reference to the accompanying drawings of which there are six sheets, which by way of illustration show a preferred embodiment of the invention and what I now consider to be the best mode of applying the principles thereof. Other embodiments of the invention may be made without departing from the scope of the invention as set forth in the appended claims.

In the drawings:

Figure 4 is a fragmentary vertical sectional view taken along the line 4—4 of Figure 2, and showing in elevation the final drive assembly of the left side of the transmission;

Figure 5 is a view partly in section of the final drive assembly for the right side of the transmission taken generally along the line 5—5 of Figures 2 and 3;

Figure 6 is an enlarged fragmentary sectional view of one of the hydraulic actuated multiple disc clutches taken along the line 6—6 of Figure 3;

Figure 7 is a fragmentary sectional view taken along the line 7—7 of Figure 2; and Figure 8 is a fragmentary sectional view taken along the line 8—8 of Figure 2.

Figure 1:
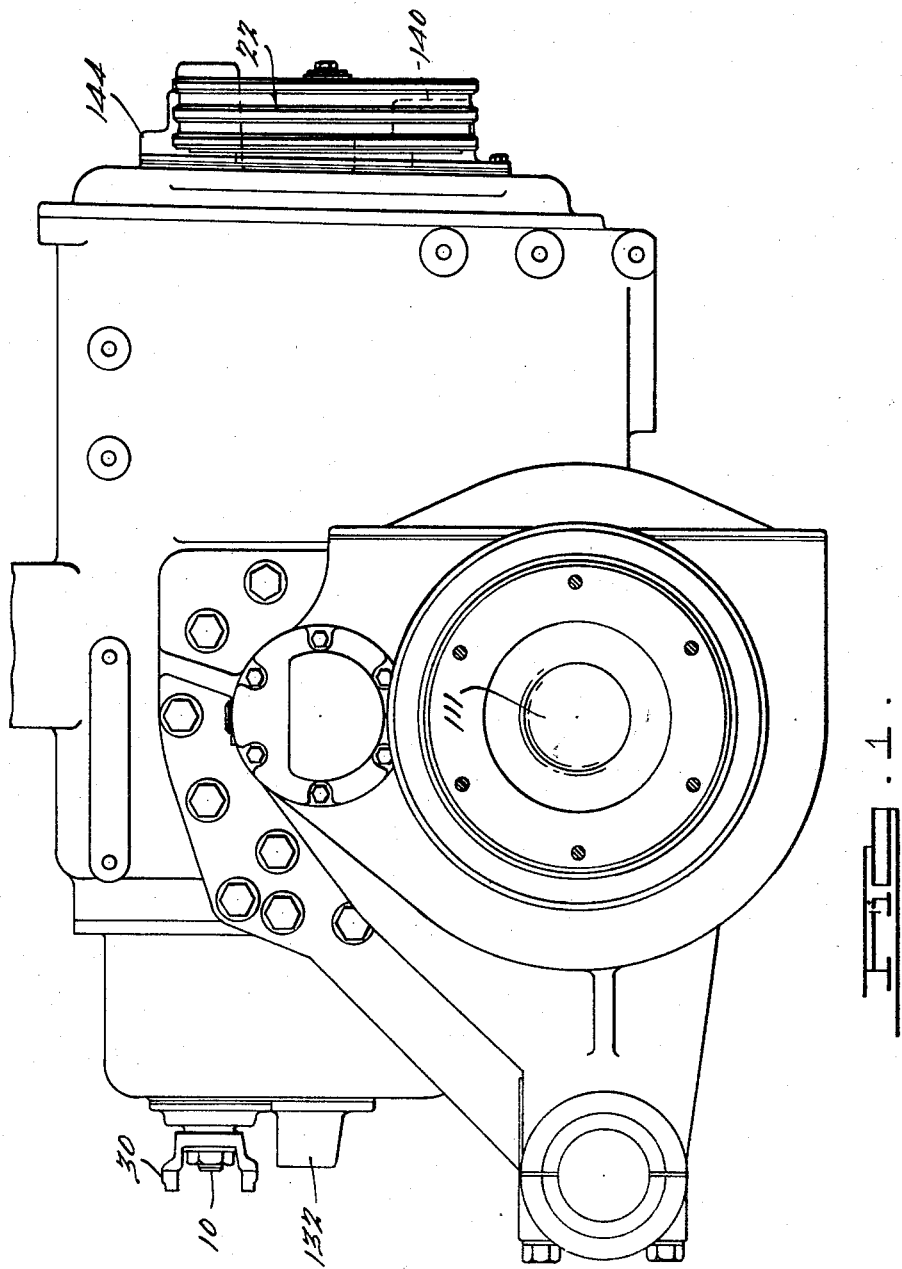
Figure 1 is an elevational view of the left side of a transmission embodying the invention with the drive sprocket removed.
Figure 2:
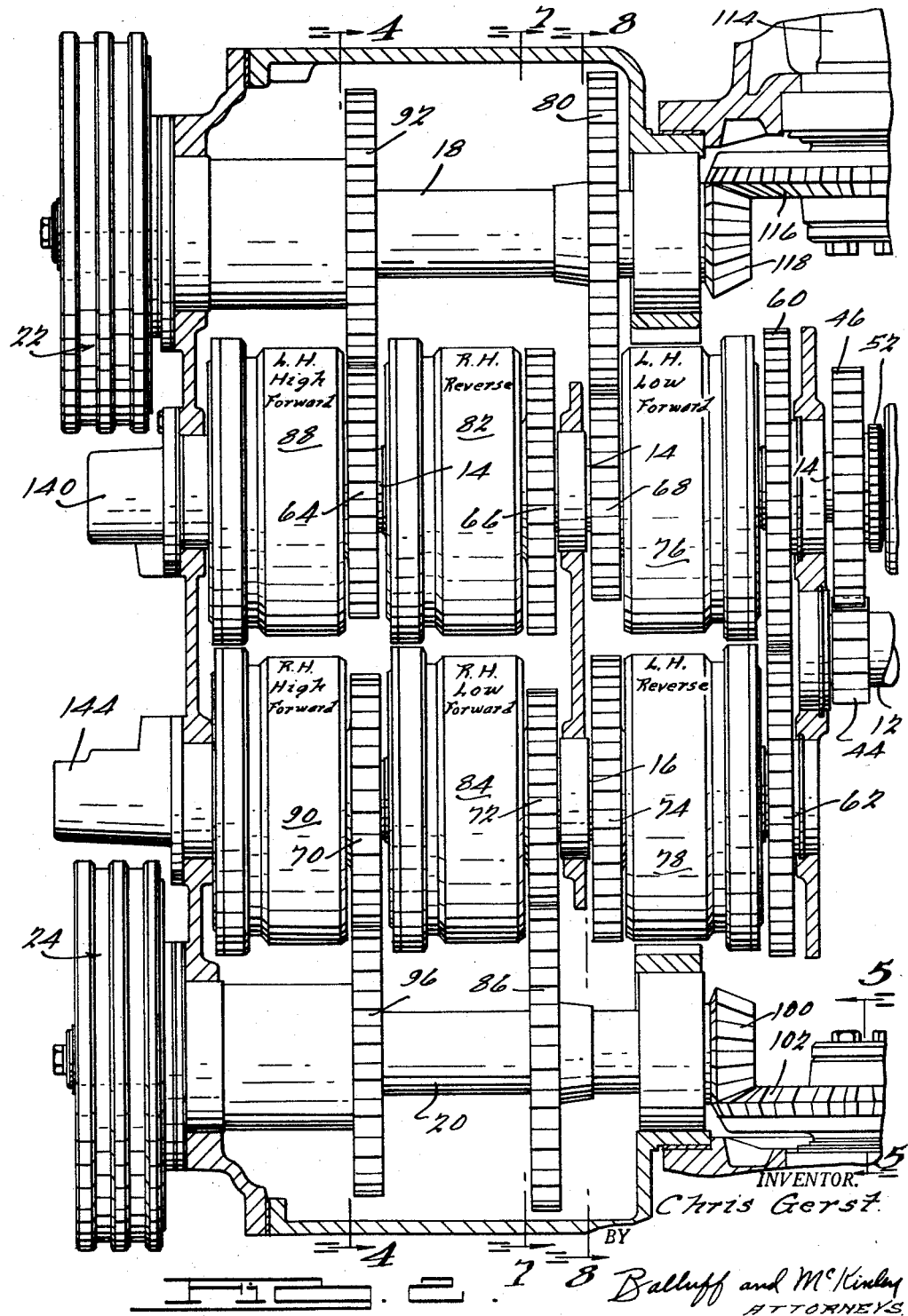
Figure 2 is a fragmentary developed generally horizontal view of the transmission.
Figure 3:
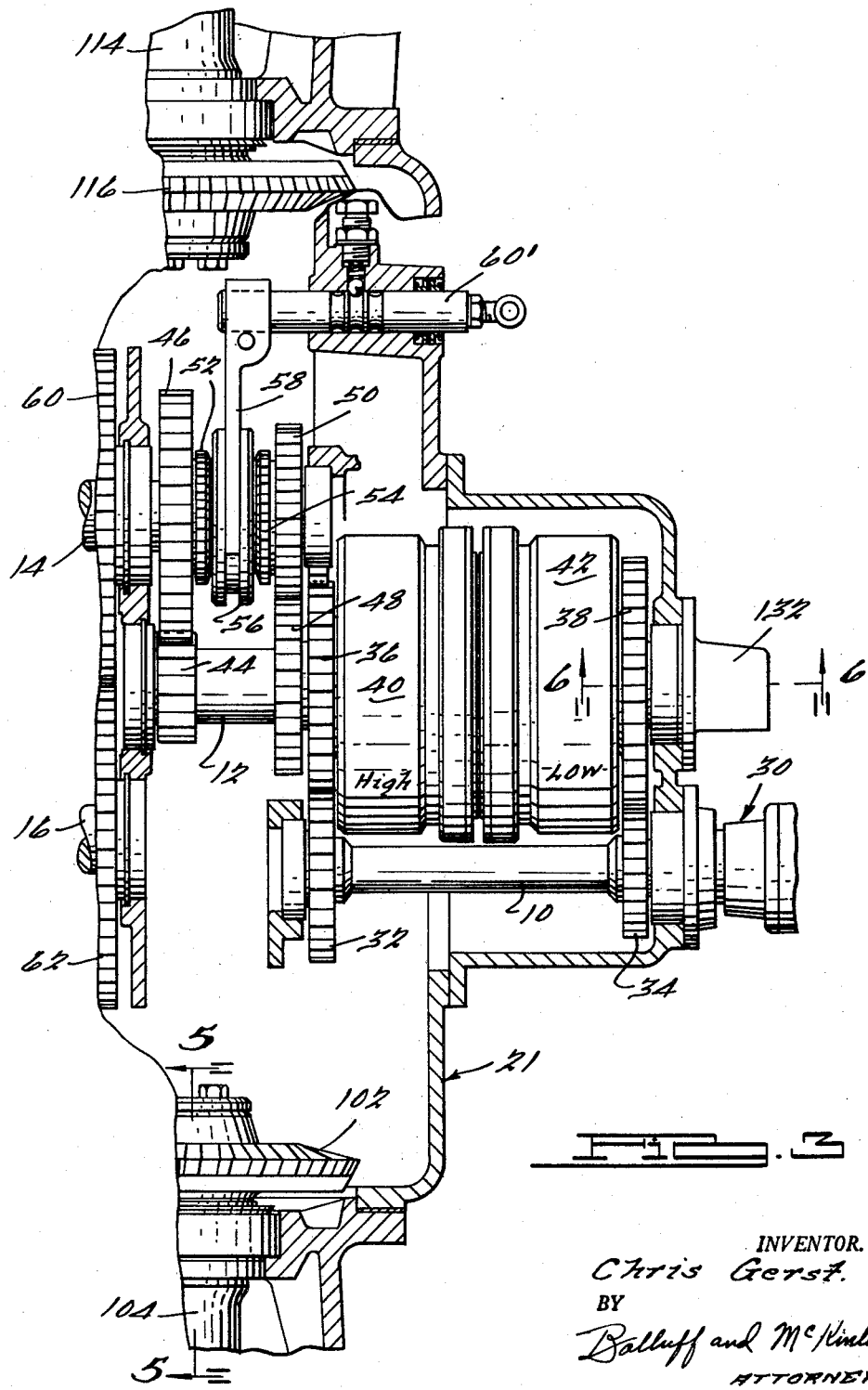
Figure 3 is a developed view which is a continuation of Figure 2 and showing the change speed gearing on input side of the transmission.

Referring now particularly to Figures 2 and 3, a transmission embodying the invention comprises an input shaft 10, a counter shaft 12, a pair of clutch shafts 14 and 16, a pair of output shafts 18 and 20, brakes 22 and 24 associated with the shafts 18 and 20 and a pair of final drive assemblies, the one for the right side being shown in Figure 5. The reference to the shafts as input, output, clutch or counter shafts is for convenience in differentiating the respective shafts for descriptive purposes.

The input shaft 10, counter shaft 12 and the forwardly projecting end of the clutch shaft 14 are adapted to be drivingly interconnected by clutch controlled gearing (Figure 3) which provides a four-speed drive on the input side of the transmission. The shafts, gears, clutches and other parts of the transmission are suitably housed and supported in a casing indicated generally at 21 in which are mounted the bearings for the shafts and which also contains a quantity of lubricant for lubricating the transmission.

The brakes 22 and 24 are normally disengaged and are of conventional construction and are adapted to be selectively or simultaneously applied for braking the shafts 18 or 20 and the drive sprockets driven thereby. The shaft 20 is provided with a bevel pinion 100 which meshes with bevel gear 102 fixed to shaft 104 for rotation therewith. As shown in Figure 5, a pinion 106 fixed to the shaft 104 is in constant mesh with gear 108 fixed to axle shaft 110, to the outer end of which drive sprocket 112 is fixed. The gear 102, shaft 104, gear 106, gear 108 and axle 110 provide the final drive on the output end of the transmission on the right side thereof looking at the transmission as it would appear to an operator seated in a tractor so as to drive the same. A corresponding final drive arrangement is provided on the output end on the left side of the transmission for driving the sprocket 113 on such side. The axle 110 is axially aligned with the axle 111 on the left side of the transmission and likewise the shaft 104 is axially aligned with its counterpart shaft 114 which carries bevel gear 116 meshing with bevel pinion 118 on shaft 18.

The shafts 10, 12, 14, 16, 18 and 20 are all disposed on axes parallel to each other as shown in Figures 4, 7 and 8. Figures 2 and 3 are developed views with the shafts 10, 12, 14 and 16 shown out of their actual position so as to better illustrate the construction and operation of the transmission. The input shaft 10 projects forwardly of the transmission casing for connection by a universal joint 30 to an engine. Gears 32 and 34 fixed to the shaft 10 to rotate therewith are in constant mesh with gears 36 and 38 respectively which normally run free on the counter shaft 12. A hydraulically actuated multiple disc clutch 40 is operatively disposed between the gear 36 and the shaft 12 and is adapted when engaged to couple the gear 36 to the shaft 12, whereby the latter may be driven from the shaft 10 through gears 32, 36 and clutch 40, the driven part of which is fixed to the shaft 12. Similarly a hydraulically actuated multiple disc clutch 42 is operatively disposed between the gear 38 and the shaft 12 and is adapted when engaged to couple the gear 38 to the shaft 12, whereby the shaft 12 may be driven from the shaft 10 through gears 34 and 38 and clutch 42, the driven part of which is fixed to the shaft 12 for rotation therewith. The clutches 40 and 42 are normally disengaged, but are adapted to be selectively engaged by a conventional hydraulic control which supplies hydraulic fluid under pressure to either of the clutches 40 or 42 for engaging the same. The clutches 40 and 42 cannot be engaged at the same time. The clutches 40 and 42 and the other hydraulically actuated multiple disc clutches hereinafter referred to are of the construction disclosed and claimed in my United States Patent No. 2,880,834 issued April 7, 1959, for Hydraulically Actuated Multiple Disc Clutch.

Gear 44 fixed to the shaft 12 to rotate therewith is in constant mesh with gear 46 which is journaled on the shaft 14. Gear 48 fixed to the shaft 12 for rotation therewith is in constant mesh with gear 50 journaled on the shaft 14. The gears 46 and 50 are each provided with a set of clutch teeth 52 or 54. Clutch member 56 which is slidably splined on the shaft 14, is shown in neutral position between the sets 52 and 54 of clutch teeth and is provided with one set of clutch teeth for engagement with the set 52 on the gear 46 when the clutch member 56 is shifted to the left so as to couple the gear 46 to the shaft 14. The clutch member 56 is provided with a second set of clutch teeth engageable with the set 54 for coupling the gear 50 to shaft 14 when clutch member 56 is shifted to the right. A shift fork 58 running in a groove on the clutch member 56 is mounted on a shift rod 60' which in turn is mounted for axial movement in a bore in the transmission case, whereby the clutch member 56 may be shifted to the right or left from the neutral position shown for selectively coupling gears 50 and 46 to the shaft 14 for driving the latter. Thus as one of the clutches 40 and 42 is engaged and if the clutch member 56 is in position so as to couple one of the gears 46 and 50 to the shaft 14, the latter will be driven in one of four different speeds from the shaft 10 provided by the change speed gearing just described.

Referring now to Figure 2, clutch shaft 14 has gear 60 fixed thereon for rotation therewith while shaft 16 has gear 62 fixed thereon for rotation therewith. The teeth of the gears 60 and 62 are in constant mesh, whereby the shafts 14 and 16 simultaneously rotate in opposite directions at the same speed. The shaft 14 has gears 64, 66 and 68 journaled thereon and the shaft 16 has gears 70, 72 and 74 journaled thereon. Normally disengaged multiple disc clutch 76 operatively disposed between the gear 68 and the shaft 14 is adapted when engaged to couple the gear 68 to the shaft 14 for rotation therewith. Normally disengaged multiple disc clutch 78 is operatively disposed between the gear 74 and the shaft 16 and is adapted when engaged to couple the gear 74 to the shaft 16 for rotation therewith. The gears 68 and 74 are each in constant mesh with a gear 80 on the shaft 18 (Figure 8), whereby the latter may be driven from the shaft 14 or 16 through the gears 68 or 74 depending upon which of the clutches 76 and 78 is engaged.

Normally disengaged multiple disc clutch 82 is operatively disposed between the gear 66 and the shaft 14 and is adapted when engaged to couple the gear 66 to the shaft 14 for rotation therewith. Normally disengaged multiple disc clutch 84 is operatively disposed between gear 72 and the shaft 16 and is adapted when engaged to couple the gear 72 to the shaft 16 for rotation therewith. The gears 66 and 72 are each in constant mesh with gear 86 on the shaft 20 (Figure 7), whereby the latter may be driven from the shaft 14 or the shaft 16 depending upon which of the clutches 82 and 84 is engaged.

Normally disengaged clutch 88 is operatively disposed between the gear 64 and the shaft 14 and is adapted when engaged to couple the gear 64 to the shaft 14 for rotation therewith. A normally disengaged multiple disc clutch 90 is operatively disposed between the gear 70 and the shaft 16, whereby the gear 70 may be coupled to the shaft 16 for rotation therewith. The gear 64 is in constant mesh with the gear 92 (Figure 4) fixed to the shaft 18 while the gear 70 is in constant mesh with the gear 96 fixed to the shaft 20. Thus, the shaft 18 may be driven from the shaft 14 in one direction through the gear train 80, 68 and clutch 76 or through the gear train 92, 64 and clutch 88. In addition the shaft 18 may be driven in the opposite direction from the shaft 16 through the gear train 80, 74 and the clutch 78. In a similar fashion the shaft 20 may be driven from the shaft 16 in one direction through the gear train 86, 72 and clutch 84 or through the gear train 96, 70 and clutch 90. Shaft 20 also may be driven in the opposite direction from the shaft 14 through the gear train 86, 66 and clutch 82.

The clutch 76 when engaged provides a low speed forward drive to the drive sprocket 113 on the left side of the transmission, while the clutch 78 provides a reverse drive to such sprocket. Clutch 82 provides a reverse drive for the drive sprocket 112 on the right side of the transmission while the clutch 84 provides a low forward speed drive for the sprocket 112. Clutch 88 provides a high speed drive for the sprocket 113 while the clutch 90 provides a high forward speed for the sprocket 112.

Clutches 76, 78, 82, 84, 88, 90, 40 and 42 are all normally disengaged hydraulically actuated multiple disc clutches having a construction as shown in Figure 6. The controls for such clutches are conventional and will enable any of the clutches to be engaged independently of the other. Obviously only one of the clutches 82, 84 and 90 may be engaged at one time and only one of the clutches 76, 78 and 88 may be engaged at one time. Thus, with the arrangement shown the drive sprocket on one side of the transmission may be driven while the other is not; the drive sprocket on one side may be driven in one direction while the other is driven in the opposite direction; or the drive sprocket on one side may be driven at high speed in a forward direction while the driving sprocket on the other side is driven in low speed in a forward direction.

The construction of the clutch 42 as shown in Figure 6 is typical of the other hydraulically actuated multiple disc clutches employed in the transmission. As shown in Figure 6, the drum or driven part 120 of the clutch is splined to the shaft 12 for rotation therewith while the driving part 122 of the clutch is fixed to the gear 38 for rotation therewith and is journaled on the shaft 12 by means of bearings 124. A series of inter-leaved clutch discs 126 alternately connected to the drum 120 and the driving sleeve 122 are adapted when engaged to provide a driving connection between the driving and driven parts of the clutch. The clutch discs 126 are normally free of pressure and disengaged but are adapted to be clamped together by an annular piston 128 when the same is subjected to hydraulic pressure.

An annular series of springs 130 biases the piston 128 to a disengaged position. The shaft 12 is provided with an axially extending bore or duct 129 which at one end communicates with the cylinder in which the piston 128 is slidable and at its other end communicates with a hole 131 in a cap 132. The cap 132 covers the end of the shaft 12 which projects from the transmission casing 21 and is secured to the casing. A hydraulic fluid pressure line suitably connected to the hole 131 in the cap 132 is adapted to supply hydraulic fluid under pressure through the hole 131 in the cap 132, and through the duct 129 in the shaft 12 to the back side of the piston 128 for actuating the same so as to apply pressure to the clutch discs 126 and thereby engage the clutch 42. As soon as the fluid pressure supplied to the clutch is released the springs 130 will promptly retract the piston 128 and disengage the clutch.

The shaft 12 is also provided with another bore or duct (not shown) which communicates with another hole 134 in the cap, whereby fluid under pressure may be supplied to the clutch 40. The hydraulic fluid supply to the clutches 40 and 42 may be controlled by a three-position valve (not shown), in the neutral position of which no fluid pressure is supplied to the actuating piston of the clutches 40 or 42. By shifting such a valve in one direction from neutral fluid pressure may be supplied to the clutch 42 while shifting the valve in the other direction from neutral supplies fluid to clutch 40. In the neutral position of the valve the fluid pressure supply to each of the clutches 40 and 42 is cut off and released so that the clutch springs 130 may function as previously indicated to disengage the clutch as soon as valve is returned to its neutral position. Similarly a cap 140 is mounted on the transmission around the projecting end of the clutch shaft 14, whereby hydraulic fluid pressure may be supplied to the clutches 82, 76 and 88 for selectively engaging the same. Similarly a cap 144 is mounted on the transmission over the projecting end of the clutch shaft 16, whereby hydraulic fluid under pressure may be supplied to the clutches 78, 84 and 90 for selectively engaging the same. The valves which control the supply of fluid to the various clutches of the transmission may be contained in single body 146 and mounted on the transmission housing or casing 21. The transmission casing 21 is made of a series of castings which are bolted or otherwise suitably secured together so as to form a rugged support for the bearings on which the various shafts of the transmission are journaled.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A counterrotating transmission comprising an input shaft, a pair of output shafts, a pair of unidirectional clutch shafts continuously geared together, change speed gearing connecting said clutch shafts to said input shaft so as to be driven thereby, a set of gears including one rotatably journaled on each of said clutch shafts, geared with one of said output shafts independently of the geared interconnection between said clutch shafts, another set of gears including one rotatably journaled on each of said clutch shafts, geared with the other of said output shafts independently of the geared interconnection between said clutch shafts, a normally disengaged clutch operatively disposed between each of said clutch shafts and each of said gears thereon for selectively coupling said gears on each of the clutch shafts thereto, and clutch controlled parallel driving connections between said clutch and output shafts independent of said sets of gears.

2. A counterrotating transmission comprising an input shaft, a pair of output shafts, a pair of unidirectional clutch shafts continuously geared together and connected to said input shaft so as to be driven thereby, each of said clutch shafts having a set of three gears rotatably journaled thereon, two of the gears of each set being geared with one of said output shafts independently of the geared interconnection between said clutch shafts, and the other of the gears of each set being geared with the other of said output shafts independently of the geared interconnection between said clutch shafts, and a normally disengaged hydraulically actuated multiple disc clutch operatively disposed between each of said clutch shafts and each of said gears thereon for selectively coupling said gears on each of the clutch shafts thereto.

3. A counterrotating transmission comprising a pair of axially aligned output shafts, a pair of unidirectional clutch shafts, a set of three gears rotatably journaled on one of said clutch shafts, two of said gears being geared with one of said aligned shafts and the other of said gears being geared with the other of said aligned shafts, another set of three gears rotatably journaled on the other of said clutch shafts, two of the gears of said other set being geared with the other of said aligned shafts and the other of said gears of said other set being geared with said one of said aligned shafts, and a normally disengaged disc clutch operatively disposed between each of said clutch shafts and each of said gears thereon for selectively coupling said gears on each of the clutch shafts thereto, and other gears interconecting said clutch shafts so as to turn together.

4. A counterrotating transmission comprising a pair of axially aligned output shafts, a pair of clutch shafts, a set of three gears rotatably journaled on one of said clutch shafts, two of said gears being continuously geared with one of said aligned shafts and the other of said gears being continuously geared with the other of said aligned shafts, another set of three gears rotatably journaled on the other of said clutch shafts, two of the gears of the other set being continuously geared with the other of said aligned shafts and the other of said gears of said other set being continuously geared with said one of said aligned shafts, and a normally disengaged disc clutch operatively disposed between each of said clutch shafts and each of said gears thereon for selectively coupling said gears on each of the clutch shafts thereto, and other gears interconnecting said clutch shafts so as to turn together in opposite directions.

5. A counterrotating transmission comprising a pair of clutch shafts continuously connected by constant mesh gearing so as to run together, a pair of output shafts, and other gearing between said clutch and output shafts including three gears rotatably journaled on each of said clutch shafts and a normally disengaged clutch between each of said three gears and its respective clutch shaft for selectively directly coupling each of said three gears to its respective shaft so as to drive any selected one of said three gears by and with the shaft on which it is mounted, said other gearing providing for each output shaft a drive in one direction selectively from either of two of said three gears on one clutch shaft and a drive in the other direction from the other clutch shaft through the third of said three gears thereon.

6. A counterrotating transmission comprising a pair of clutch shafts continuously geared together, change speed gearing connected to one of said shafts for simultaneously driving said shafts, a pair of aligned output shafts, and other gearing between said clutch and output shafts including three gears rotatably journaled on each of said clutch shafts and a normally disengaged clutch between each of said three gears and its respective clutch shaft for selectively directly coupling each of said three gears to its respective shaft so as to drive any selected one of said three gears by and with the shaft on which it is mounted, said other gearing providing for each output shaft a drive in one direction selectively from either of two of said three gears on one clutch shaft and a drive in the other direction from the other clutch shaft through the third of said three gears thereon.

7. A counterrotating transmission comprising a pair of clutch shafts and a pair of output shafts disposed in parallel, each of said clutch shafts having two gears rotatably journaled thereon, the gears on one clutch shaft being continuously geared to one of said output shafts and the gears on the other clutch shaft being continuously geared to the other of said output shafts, each of said clutch shafts having a third gear rotatably journaled thereon, the third gear on said one clutch shaft being continuously geared to said other of said output shafts and the third gear on said other clutch shaft being continuously geared to said one output shaft, a clutch operatively disposed between each of said gears and the clutch shaft on which it is journaled, and means other than said gears for driving said clutch shafts simultaneously.

8. A counterrotating transmission according to claim 7 wherein said means for driving said clutch shafts simultaneously include gearing drivingly interconnecting said shafts together for simultaneous rotation in opposite directions.

9. A transmission according to claim 7 wherein each of said output shafts is disposed closer to one of said clutch shafts than to the other clutch shaft.

10. A counterrotating transmission comprising a pair of parallel clutch shafts, and a pair of parallel output shafts, each of said clutch shafts having two gears rotatably journaled thereon, the gears on one clutch shaft being continuously geared to one of said output shafts and the gears on the other clutch shaft being continuously geared to the other of said output shafts, each of said clutch shafts having a third gear rotatably journaled thereon, the third gear on said one clutch shaft being continuously geared to said other of said output shafts and the third gear on said other clutch shaft being continuously geared to said one output shaft, a clutch operatively disposed between each of said gears and the clutch shaft on which it is journaled, and means including constant mesh gears other than the aforesaid gears for continuously driving said clutch shafts simultaneously in opposite directions relative to each other.

11. A counterrotating transmission comprising an input shaft, a pair of clutch shafts, change speed gearing between said input shaft and one of said clutch shafts for selectively driving the same at different speeds relative to said input shaft, a pair of output shafts, a clutch controlled constant mesh gear train between each of said clutch shafts and each of said output shafts, said clutch shafts being arranged in parallel with respect to each other, another clutch controlled constant mesh gear train between one clutch shaft and one output shaft and another clutch controlled gear train between the other clutch shaft and the other output shaft, each of said clutch controlled gear trains including a normally disengaged multiple disc clutch, and other constant mesh gearing interconnecting said clutch shafts for rotation together.

12. A counterrotating transmission comprising an input shaft, a pair of clutch shafts, change speed gearing between said input shaft and one of said clutch shafts for selectively driving the same at different speeds relative to said input shaft, a pair of output shafts, a clutch controlled gear train between each of said clutch shafts and each of said output shafts, another clutch controlled gear train between one clutch shaft and one output shaft, another clutch controlled gear train between the other clutch shaft and the other output shaft, said shafts being arranged in parallel with respect to each other, each of said clutch controlled gear trains including a normally disengaged multiple disc clutch, and other gearing continuously interconnecting said clutch shafts for simultaneous rotation.

13. A counterrotating transmission comprising a pair of parallel shafts, a pair of output shafts, a clutch controlled gear train between each of said parallel shafts and each of said output shafts, another clutch controlled gear train between one parallel shaft and one output shaft, another clutch controlled gear train between the other parallel shaft and the other output shaft, and other gearing continuously interconnecting said parallel shafts for simultaneous rotation.

References Cited in the file of this patent

UNITED STATES PATENTS

| | | |
|---|---|---|
| 2,804,780 | Gerst | Sept. 3, 1957 |
| 2,866,350 | Gerst | Dec. 30, 1958 |
| 2,866,360 | Gerst | Dec. 30, 1958 |
| 2,912,872 | Gerst | Nov. 17, 1959 |